O. S. JACKSON.
WHIFFLETREE.
APPLICATION FILED JULY 27, 1912.
1,047,065.
Patented Dec. 10, 1912.
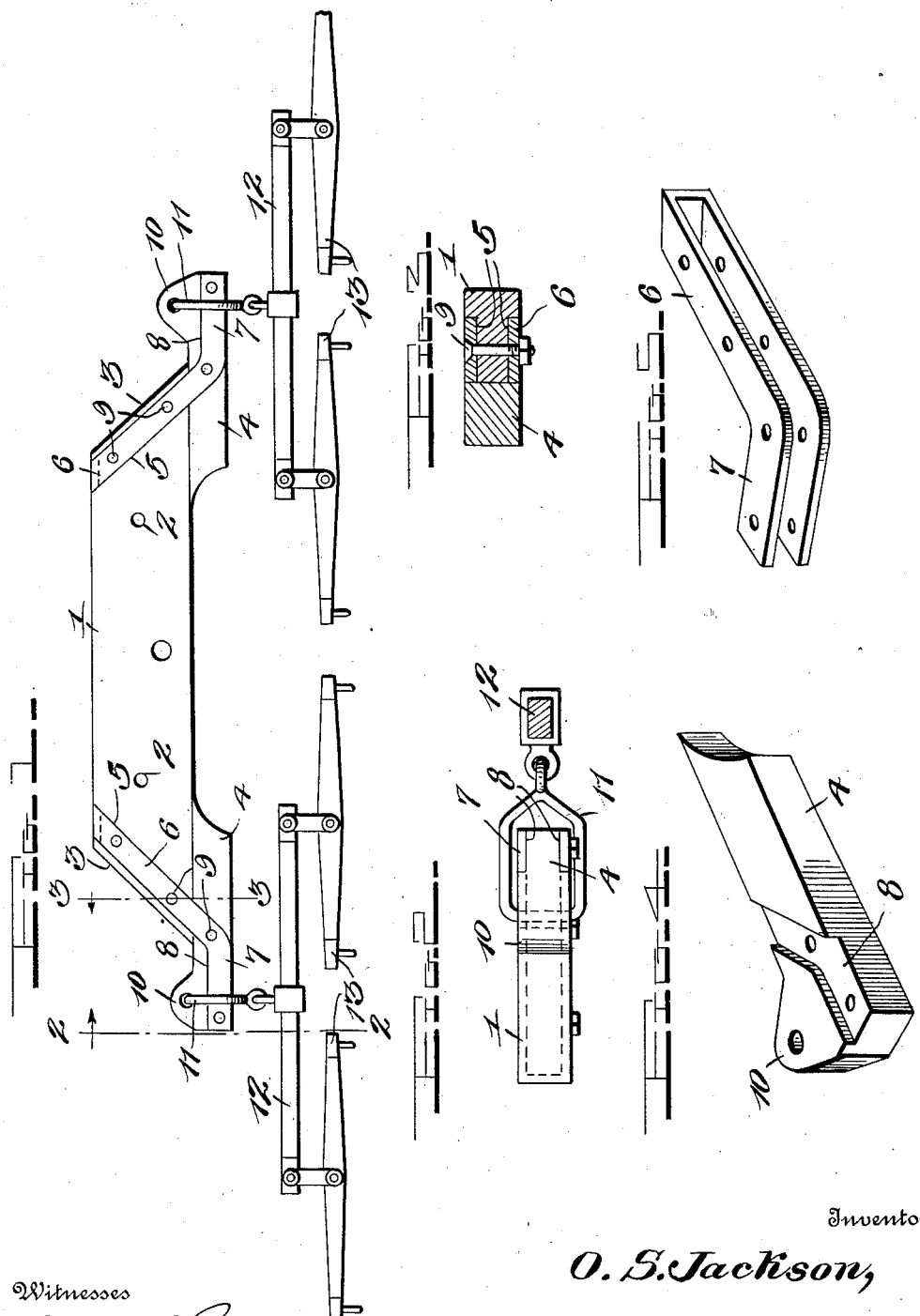
Witnesses
Chas. L. Griesbauer.
A. B. Norton.
Inventor
O. S. Jackson,
By Watson E. Coleman.
Attorney

UNITED STATES PATENT OFFICE.

OLIVER S. JACKSON, OF BEVERLY, TEXAS.

WHIFFLETREE.

1,047,065.　　　　Specification of Letters Patent.　　Patented Dec. 10, 1912.

Application filed July 27, 1912. Serial No. 711,850.

*To all whom it may concern:*

Be it known that I, OLIVER S. JACKSON, a citizen of the United States, residing at Beverly, in the county of Briscoe and State of Texas, have invented certain new and useful Improvements in Whiffletrees, of which the following is a specification, reference being had to the accompanying drawings.

This invention relates to improvements in double trees, and an object thereof is the provision of a double tree which may be quickly and easily converted into a four horse evener.

Another object of this invention is the provision of a double tree which is formed with longitudinally extending members on its opposite ends which are adapted to be connected to supplementary double trees whereby a four horse evener is provided.

Still another object of this invention is the provision of a double tree which may be quickly converted into a four horse evener by securing extension plates to the opposite ends of the double tree.

With these and other objects in view, my invention consists in the arrangement and combination of parts to be hereinafter more fully described and illustrated in the accompanying drawings, in which—

Figure 1 is a top plan view of my invention. Fig. 2 is a section taken on the line 2—2 of Fig. 1. Fig. 3 is a section taken on the line 3—3 of Fig. 1. Fig. 4 is a perspective view of one of the extension plates and Fig. 5 is a perspective view of one of the straps for attaching the extension plates to the double tree.

Referring more particularly to the drawings, the numeral 1 designates a double tree provided with apertures 2 for reception of chains or clevises (not shown) to which swingle trees (not shown) may be secured to provide a two horse evener. The outer ends of the double tree are beveled as at 3 and secured to the forward edge of the double tree at its opposite ends are plates 4 which extend outwardly from the ends of the double tree. Formed in the double tree in alinement with the beveled ends thereof are channels 5 in which are secured metallic straps 6. Each of the straps is formed of a strip of sheet metal doubled upon itself and having its opposite ends bent at an obtuse angle to the central portion thereof as at 7. The central portions of the straps 6 are secured in the obliquely extending channels 5 in the double tree and the opposite ends thereof are secured to the plates 4 in longitudinal channels 8. The straps 6 are detachably secured to the double tree and the plate by means of bolts 9. The plates are formed on their outer ends with rearwardly extending apertured ears 10 in which are secured clevises 11 for connection with the double trees 12 in which are pivotally secured swingle trees 13.

In the practical use of my device, it is evident that when it is used as a four horse evener, the extensions will be entirely free from the wheels of a vehicle and will not scrape them by reason of the fact that they are secured to the forward edge of the bar 1 and the beveled ends of the bar will preclude friction thereof with the wheels of a vehicle. When it is desired to use the device as a two horse evener, the bolts 9 may be readily removed from the straps 6 and the bar 1 whereupon the plates 4 can be removed from the bar and the swingle trees (not shown) applied thereto. Should any of the parts of this device become broken, it is apparent that they may be readily replaced with but minimum expense.

With the above description taken in connection with the accompanying drawings, it will be seen that I have provided a convertible two and four horse evener which may be cheaply manufactured and which will fulfil all the requirements of such a device.

Having thus described my invention, what I desire to claim and secure by Letters Patent is:—

1. A device of the character described comprising a bar having obliquely disposed channels formed in the opposite ends thereof, channeled plates disposed on the forward edge of said bar at the opposite ends thereof, and angular straps disposed in said channels and adapted to secure said plates to the said bar.

2. A device of the character described comprising a bar having obliquely extending channels in the opposite ends thereof, plates having longitudinal channels disposed on the forward edge of said bar and extending beyond the opposite ends thereof, said plates being provided with apertured ears on the outer ends thereof, whiffletrees secured to the said plates in the apertured ears thereof, and angular straps adapted to secure said plates to said bar.

3. A device of the character described comprising a bar having obliquely disposed channels formed in the opposite ends of said bar, channeled plates disposed on the forward edge of said bar and extending beyond the ends thereof, angular straps secured in the channels in the said bar and the said plates, and the opposite ends of said bar being beveled for the purpose described.

In testimony whereof I hereunto affix my signature in the presence of two witnesses.

OLIVER S. JACKSON.

Witnesses:
LEON GOFORTH,
J. J. JACKSON.

Copies of this patent may be obtained for five cents each, by addressing the "Commissioner of Patents, Washington, D. C."